United States Patent
Dekoning

(10) Patent No.: US 7,861,851 B2
(45) Date of Patent: Jan. 4, 2011

(54) APPARATUS FOR MOVING GRAIN FROM A PILE OR A BAG

(76) Inventor: Hubertus Dekoning, R.R. #2, Manitoba, Neepawa (CA) R0J 1H0

(*) Notice: Subject to any disclaimer, the term of this patent is extended or adjusted under 35 U.S.C. 154(b) by 164 days.

(21) Appl. No.: 12/271,122

(22) Filed: Nov. 14, 2008

(65) Prior Publication Data
US 2009/0133988 A1 May 28, 2009

(30) Foreign Application Priority Data
Nov. 14, 2007 (CA) .................................. 2610523

(51) Int. Cl.
*B65G 65/22* (2006.01)

(52) U.S. Cl. ............ 198/513; 198/519; 198/308.1; 198/309; 198/313; 198/317

(58) Field of Classification Search .......... 198/308.1, 198/309, 313, 317, 513, 519
See application file for complete search history.

(56) References Cited
U.S. PATENT DOCUMENTS

| | | | | |
|---|---|---|---|---|
| 3,976,186 A | * | 8/1976 | Neier | .......... 198/314 |
| 4,157,164 A | * | 6/1979 | Helm et al. | .......... 241/101.72 |
| 5,256,021 A | * | 10/1993 | Wolf et al. | .......... 414/393 |
| 7,234,909 B2 | * | 6/2007 | Jonkka | .......... 414/302 |

* cited by examiner

Primary Examiner—Joe Dillon, Jr.
(74) Attorney, Agent, or Firm—Adams Intellectual Property Law

(57) ABSTRACT

An apparatus for moving grain from a grain includes a vertical main auger at a rear end of a frame, a knife extending rearward to cut the grain bag, a turret auger pivotally attached to the top of the main auger, and a feed auger extending laterally from the bottom intake of the main auger. A bias element forces a pair of pinching rollers against each other. A drive rotates the pinching rollers such that an empty portion of the bag can be fed between the rollers and the rollers rotated to pull the empty bag upward from the ground and forward between the rollers such that the empty bag falls on the ground in front of the rollers as the frame moves rearward, and such that the frame is pulled rearward by the rollers and the feed auger moves rearward into a filled portion of the grain bag.

19 Claims, 3 Drawing Sheets

APPARATUS FOR MOVING GRAIN FROM A PILE OR A BAG

This invention is in the field of agricultural equipment and in particular an apparatus for removing grain from a large plastic bag, or from a pile on the ground.

BACKGROUND

Grain bags, typically made from plastic, are becoming popular for storing grain including corn, beans, and like agricultural produce. The bags come in packages that are attached to a loading machine which receives grain from a transport vehicle, and pushes the grain into the bag. As the bag fills, the machine moves ahead, such that the grain bag fills and stretches out behind the loading machine. A typical bag will be about nine feet across, and 200 or more feet long. The width of the loaded bag will vary somewhat, depending on the grain that is being stored.

To unload the bag, an extractor machine is provided that includes feed augers extending laterally right and left along the ground from the input end of a main auger. The main auger is oriented at an angle such that the discharge end is located at an elevated position to one side of the machine so that the main auger can discharge into a transport vehicle. The main auger is typically folded down for transport. In some machines the feed augers can be pivoted rearward to adjust the distance between the outer ends of the feed augers to match the width of the bag.

Thus to unload a bag, the end of the bag is cut open and the feed augers moved to the correct spread to fit the bag. In one type of extractor machine, the wheels of the machine drive over the inside of the bag, which is left on the ground. The machine moves rearward as the grain is collected by the feed augers and raised to the transport vehicle by the main auger. A knife at the top rear of the machine is oriented to slice the top of the bag as the machine moves rearward, and as the grain is removed the empty bag is pushed to each side of the machine, and the wheels of the machine pass over the inside of the bag.

In another type of extractor machine, the bag is taken up on a roller. Again, the machine moves rearward as the grain is collected by the feed augers and raised to the transport vehicle by the main auger. A knife at the top rear of the machine is oriented to slice the top of the bag as the machine moves rearward, and as the grain is removed the empty bag is rolled up onto a roller at the front end of the machine. By rolling up the bag as the machine moves rearward, any grain left on the floor of the bag by the feeder augers is dumped rearward as the floor is raised by the roller. Thus there is substantially no wasted grain, and no clean up required. The empty bag must be removed from the roller periodically.

Such extractor machines can also be used for moving grain that is simply piled on the ground, or in a shed if access is sufficient.

SUMMARY OF THE INVENTION

It is an object of the present invention to provide an extractor apparatus for moving grain from grain bags that overcomes problems in the prior art.

In a first embodiment the present invention provides an extractor apparatus for moving grain from a grain bag. The apparatus comprises a frame mounted for movement along the ground in an operating travel direction. A substantially vertically oriented main auger is attached to a rear end of the frame such that an intake end thereof is above the ground and in proximity to the ground, and a knife is mounted to the frame and configured to extend rearward from the main auger to cut the grain bag. A turret auger is pivotally attached to a top end of the main auger such that the turret auger extends laterally from the main auger, and can pivot with respect to the main auger. A feed auger extends laterally right and left of the intake end of the main auger, and is configured to auger grain to the intake end of the main auger. A pair of pinching rollers is mounted on the frame forward of the main auger and above the ground such that the pinching rollers are oriented substantially perpendicular to the operating travel direction, and a bias element is operative to force the pinching rollers against each other. A drive rotates the pinching rollers such that an empty portion of the grain bag can be fed between the pinching rollers and the pinching rollers can be rotated to pull the empty portion of the grain bag upward from the ground and forward between the pinching rollers such that the empty portion of the grain bag falls on the ground in front of the pinching rollers as the frame moves rearward, and such that the frame is pulled rearward and the feed auger moves rearward into a filled portion of the grain bag.

In a second embodiment the present invention provides a method of extracting grain from a grain bag. The method comprises providing a frame mounted for movement along the ground in an operating travel direction; providing a substantially vertically oriented main auger attached to a rear end of the frame such that an intake end thereof is above the ground and in proximity to the ground; providing a knife mounted to the frame and configured to extend rearward from the main auger to cut the grain bag; providing a turret auger pivotally attached to a top end of the main auger such that the turret auger extends laterally from the main auger, and can pivot with respect to the main auger; providing a feed auger extending laterally right and left of the intake end of the main auger, and configured to auger grain to the intake end of the main auger; providing a pair of pinching rollers mounted on the frame forward of the main auger and above the ground such that the pinching rollers are oriented substantially perpendicular to the operating travel direction; forcing the pinching rollers against each other with a bias element; rotating the pinching rollers and feeding an empty portion of the grain bag between the pinching rollers such that the rotating pinching rollers pull the empty portion of the grain bag forward between the pinching rollers and such that the frame is pulled rearward and the feed auger moves rearward into a filled portion of the grain bag; operating the feed auger, main auger, and turret auger to convey grain out of the filled portion of the grain bag and out through a discharge on an outer end of the turret auger; pivoting the turret auger forward as the frame and attached main auger move rearward to maintain the discharge at a desired location to discharge grain into a transport vehicle; wherein the frame and pinching rollers are configured such that the empty portion of the grain bag falls on the ground in front of the pinching rollers as the frame moves rearward.

The bag falls to the ground after passing through the pinching rollers, rather than rolling up on a bag roller on the frame as in the prior art. Thus there is no need to stop and remove the bag when the bag roller is full, rather the bag can be picked up at any convenient time in a totally separate operation that will not interfere with the operation of emptying the bag into a transport vehicle.

Conveniently the pivot auger will be able to pivot through the greater part of a full circle. Grain moving up the main auger is received by the turret auger and carried laterally through the turret auger to a discharge end of the turret auger. A problem with presently available extractor machines is that the transport vehicle receiving the grain must be almost constantly moving to keep up with the machine as it moves rearward into the bag so that the auger discharge is properly located relative to the transport vehicle. The turret auger allows the tractor operator moving the extractor machine, who has a good view of the discharge end of the turret auger and of the transport vehicle, to pivot the turret auger when he moves, such that there is less need to closely follow the extractor machine with the transport vehicle. The turret auger combined with a tilting frame also provides a very simple transport position where the turret auger is maintained in its operating orientation with respect to the main auger, thus simplifying construction.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
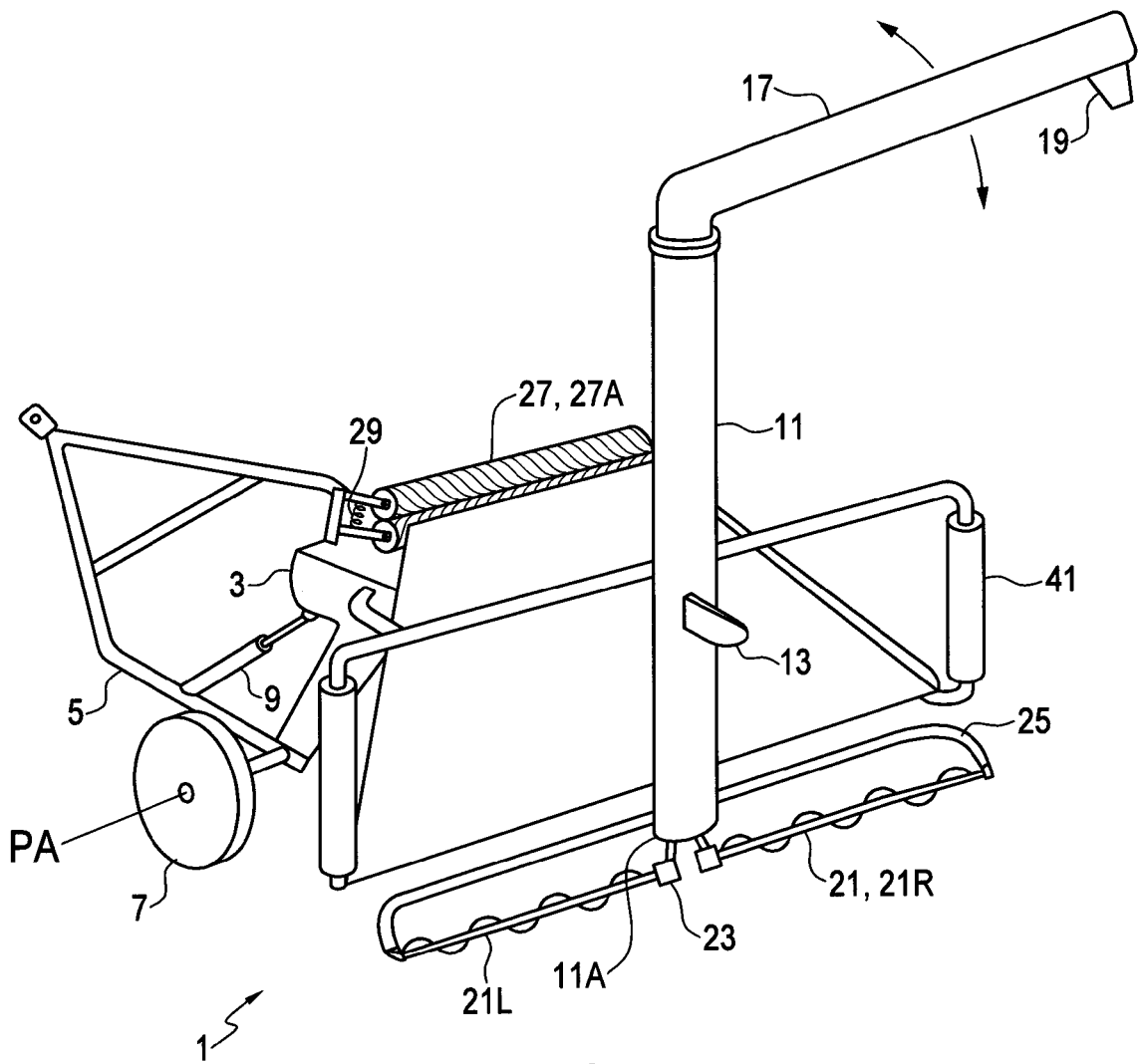
FIG. 1 is a perspective view of an embodiment of the extractor apparatus of the present invention.

FIGS. 1-4 illustrate an embodiment of an extractor apparatus 1 of the present invention for moving grain from a grain bag to a transport vehicle. The apparatus 1 comprises a frame 3 mounted for movement along the ground in an operating travel direction T. In the illustrated apparatus 1 the frame 3 is pivotally mounted on a support carriage 5 about a pivot axis PA that happens to correspond to the rotational axis of the wheels 7 that support the carriage 5 for movement along the ground. The frame 3 is movable about the pivot axis by extending or retracting the transport actuator 9 from an operating position shown in FIG. 2, to a transport position shown in FIG. 4.

Figure 3:
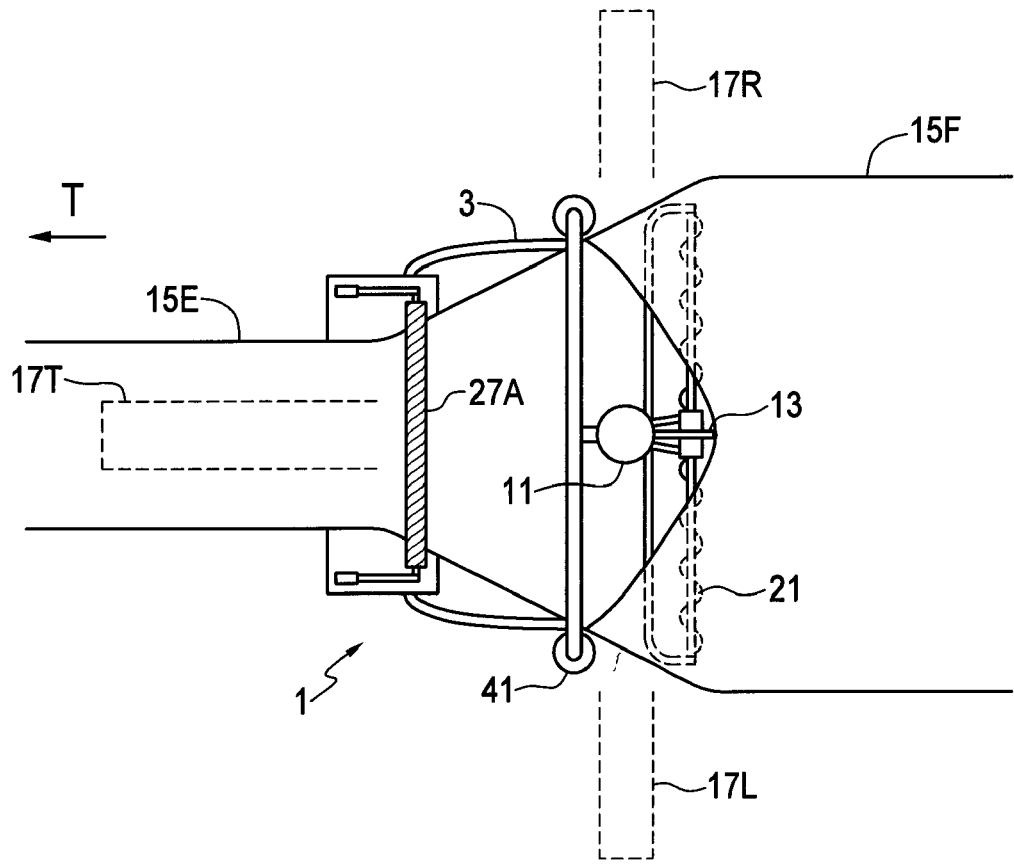
FIG. 3 is a schematic top view of the embodiment of FIG. 1 in a position to extract grain from a bag.

A substantially vertically oriented main auger 11 is attached to a rear end of the frame 3 such that an intake end 11A thereof is above the ground and in proximity to the ground. A knife 13 is mounted to the frame 3, in the illustrated embodiment by attachment to a rear side of the main auger 11. The knife 13 is configured to extend rearward from the main auger 11 to cut along the top of the grain bag 15. A turret auger 17 is pivotally attached to a top end of the main auger 11 such that the turret auger 17 extends laterally from the main auger 11 and can pivot with respect to the main auger 11. As schematically shown in FIG. 3, in the illustrated embodiment the turret auger 17 can pivot from a right position 17R extending laterally to a right side of the frame 3 through a transport position 17T extending substantially forward from the main auger, to a left position 17L extending laterally to a left side of the frame 3. The discharge 19 on the outer end of the turret auger 17 can thus be moved independent of the frame 3 while discharging to more conveniently discharge into a desired location.

Figure 2:
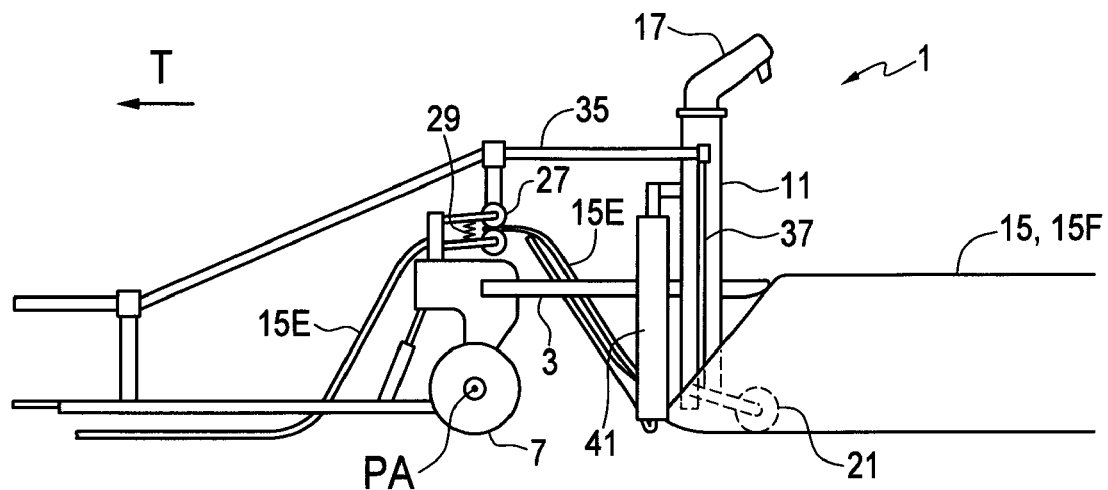
FIG. 2 is a schematic side view of the embodiment of FIG. 1 in a position to extract grain from a bag.
Figure 4:
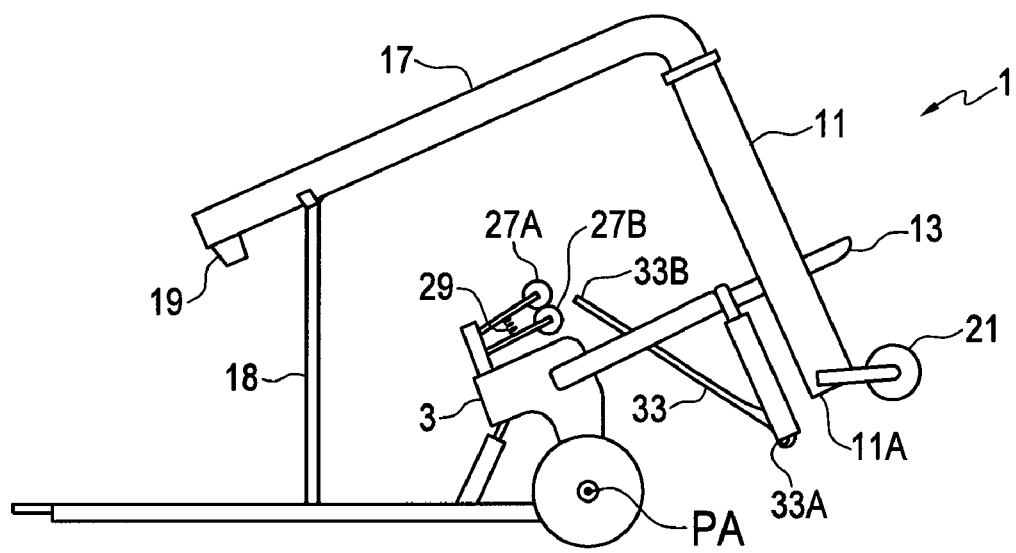
FIG. 4 is a schematic side view of the embodiment of FIG. 1 in a transport position.

The main auger 11 is substantially vertically oriented in the operating position as shown in FIG. 2, and in the transport position of FIG. 4 the main auger 11 is tilted forward and the turret auger 17 is in position 17T as shown in FIG. 3, extending forward from the top end of the main auger 11, and downward. A support brace 18 is configured and operative to support the turret auger 17 in the transport position of FIG. 4. Tilting the frame 3 forward to the transport position of FIG. 4 also raises the intake end 11A of the main auger 11, and the feed auger 21 up away from the ground for safe transport. The pivoting turret auger 17 combined with the tilting frame 3 provide a transport position where it is not required to fold down the laterally extending auger, as is common in the prior art. The mechanism is thus simple and economical.

A feed auger 21 extends laterally right and left of the intake end 11A of the main auger 11, and is configured to auger grain to the intake end 11A of the main auger 11. The feed auger 21 can be a single auger with a right hand flight on one side of the intake end 11A and a left hand flight on the opposite side of the intake end 11A, such that rotating the feed auger in one direction will move grain from both sides toward the intake end 11A in the middle of the feed auger. In the illustrated embodiment however, the feed auger 21 comprises right and left auger sections 21R, 21L driven by corresponding right and left motors 23 located adjacent to the intake end 11A of the main auger 11. The outer ends of the auger sections 21R, 21L are supported by a frame 25 extending outward from the main auger 11, and the motors 23 and inner ends of the auger sections 21R, 21L are supported by brackets attached to the main auger 11.

A pair of pinching rollers 27 are mounted on the frame 3 forward of the main auger 11 and above the ground such that the pinching rollers 27 are oriented substantially perpendicular to the operating travel direction T. A bias element 29 is operative to force the pinching rollers 27 against each other. A spring, hydraulic cylinder, or the like will typically be used to provide the bias element 29.

A drive, conveniently a hydraulic motor drive, is operative to rotate the pinching rollers 27 such that an empty portion 15E of the grain bag 15 can be fed between the pinching rollers 27 and the pinching rollers 27 rotated to pull the empty portion 15E of the grain bag 15 upward from the ground and forward between the pinching rollers 27 such that the empty portion 15 E of the grain bag 15 falls on the ground in front of the pinching rollers 27 as the frame 3 moves rearward. Rotating the pinching rollers 27 pulls the frame 3 rearward and the feed auger 21 moves rearward into a filled portion 15F of the grain bag 15.

The illustrated apparatus 1 includes a pan 33 having a lower rear edge 33A located forward of the feed auger 21 and in proximity to the ground, and extending on an incline forward and upward to an upper front edge 33B located rearward of and below a pinching location 35 where the pinching rollers 27 meet. The pan 33 supports the empty portion 15E of the grain bag 15 as it moves up to the pinching rollers. The illustrated pair of pinching rollers 27 comprises upper and lower pinching rollers 27A, 27B mounted on the frame 3 such that the upper pinching roller 27A is above the lower pinching roller 27B. The empty portion 15E of the grain bag 15 thus feeds out forward of the pinching rollers 27A, 27B and can fall to the ground.

It is contemplated that the main auger 11 can be driven by a variety of mechanisms. The main auger 11 in the illustrated apparatus 1 is driven by a rotating shaft mechanism connectable to a tractor power take off. As illustrated in FIG. 2, the rotating shaft mechanism includes a lateral shaft portion 35 extending from the main auger 11 forward to a tractor hitch location convenient for connection to the tractor, and a vertical shaft portion 37 extending down the main auger 11 from the lateral shaft portion 35 to a bottom end of the main auger 11. An enclosed auger drive, such as a chain and sprocket, gear mechanism, or the like at the bottom end of the vertical shaft portion 37 connects the vertical shaft portion 37 to the bottom end of the main auger shaft of the main auger 11. The main auger shaft of the main auger 11 is connected at the top of the main auger 11 to drive the turret auger 17.

Also provided on the illustrated apparatus 1 are vertically oriented right and left side rollers 41 rotatably mounted to the frame 3 just forward of the main auger 11, near rear corners of the pan 33. The rollers 41 are configured to contact corresponding right and left sides of the empty portion 15F of the grain bag 15 as the empty bag portion 15E is pulled upward and forward. The rollers 41 guide the empty bag portion 15E onto the pan and up to the pinching rollers 27. The width of the grain bag 15 may vary, and the rollers 41 guide the empty bag portion 15F in toward the pinching rollers with reduced friction and risk of tearing the bag. The rollers 41 also help guide the apparatus 1 with respect to the grain bag when the filled portion 15F of the grain bag is not lying straight on the ground.

Thus the invention also provides a method of extracting grain from a grain bag 15. The method comprises providing a frame 3 mounted for movement along the ground in an operating travel direction T. A substantially vertically oriented main auger 11 is attached to a rear end of the frame 3 such that an intake end 11A thereof is above the ground and in proximity to the ground. A knife 13 is mounted to the frame 13 and configured to extend rearward from the main auger 11 to cut the grain bag 15. A turret auger 17 is pivotally attached to a top end of the main auger 11 such that the turret auger 17 extends laterally from the main auger 11, and can pivot with respect to the main auger 11.

A feed auger 21 extends laterally right and left of the intake end 11A of the main auger 11, and is configured to auger grain to the intake end 11A of the main auger 11. A pair of pinching rollers 27 is mounted on the frame 3 forward of the main auger 11 and above the ground such that the pinching rollers 27 are oriented substantially perpendicular to the operating travel direction T. A bias element 29 forces the pinching rollers 27 against each other.

To initiate extraction the pinching rollers 27 are rotated and an empty portion 15E of the grain bag 15 is fed between the pinching rollers 27. When the bag 15 is filled initially, or partially emptied in a prior operation, there will generally be an empty portion left of sufficient length to pull the empty bag portion 15F under the feed auger 21, and up the pan 33 and between the pinching rollers 27. The entrance to the filled bag portion 15F is arranged as illustrated in FIGS. 2 and 3 such that the feed auger 21 is inside the bag 15, and the knife 13 is located to cut the top of the bag 15, and the bottom of the bag is under the feed auger 21 and under the intake end 11A of the main auger 11. The pinching rollers can be rotated to pull up any slack in the empty bag portion 15E and then stopped while a transport vehicle is positioned under the discharge 19 of the turret auger 17.

The pinching rollers 27 are forced together by the bias element 29 such that the empty bag portion 15E between the rotating rollers 27 is gripped with significant force. When the transport vehicle is in position, the pinching rollers 27 are rotated and pull the empty portion 15E of the grain bag 15 forward between the pinching rollers 27. The weight of the filled portion 15E of the bag 15 causes the frame 3 to be pulled rearward and the feed auger 21 moves rearward into the filled portion 15F of the grain bag 15. As the apparatus 1 moves rearward, the knife 13 mounted on the main auger 9 slices the top of the bag IS such that the empty bag portion 15E falls away to the ground on each side.

The feed auger 21, main auger 11, and turret auger 17 are operated to convey grain out of the grain bag 15 and out through the discharge 19 on an outer end of the turret auger 17, and the apparatus 1 moves rearward as grain is removed from the bag 15. As the bag 15 is emptied, the empty bag portion 15 is supported on the pan 33 as same is pulled upward from the ground and forward between the pinching rollers 27. The feed auger 21 is somewhat above the bottom of the bag 15 and so some grain is left on the bottom of the empty bag portion 15E. Moving the empty bag portion 15 upward causes this grain left in the bag 15 to fall down rearward where same can be continuously to be removed. The empty bag portion 15E is thus essentially empty of all grain when it passes between the pinching rollers 27. In contrast in prior art systems where the bag is simply left on the ground and the wheels of the machine pass over the bag, some grain is left behind in the empty bag.

As the apparatus 1 moves rearward, the frame 3 and pinching rollers 27 are configured such that the empty portion 15E of the grain bag 15 falls on the ground in front of the pinching rollers 27 as the frame 3 moves rearward. The empty bag 15 can thus be picked up at a later time in a separate operation. The grain extracting process is thus not interrupted by the need to remove an empty bag from a roller on the machine, as is common in the prior art.

In the prior art as the extracting apparatus moved rearward, the transport vehicle had to move rearward as well in order to follow the discharge. In the apparatus 1 of the present invention however, the turret auger 17 conveniently can be pivoted forward as the frame 3 and attached main auger 11 move rearward, thereby maintaining the discharge 19 at a desired location to discharge grain into the transport vehicle.

Also where the width of the grain bag 15 varies or when the filled portion 15F of the grain bag is not lying straight on the ground, the rollers 41 guide the empty bag portion 15E in toward the pinching rollers 27 with reduced friction and risk of tearing the bag.

The apparatus 1 could also be used to move grain from a grain pile on the ground to a transport vehicle.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An extractor apparatus for moving grain from a grain bag, the apparatus comprising:

a frame mounted for movement along the ground in an operating travel direction;

a substantially vertically oriented main auger attached to a rear end of the frame such that an intake end thereof is above the ground and in proximity to the ground;

a knife mounted to the frame and configured to extend rearward from the main auger to cut the grain bag;

a turret auger pivotally attached to a top end of the main auger such that the turret auger extends laterally from the main auger, and can pivot with respect to the main auger;

a feed auger extending laterally right and left of the intake end of the main auger, and configured to auger grain to the intake end of the main auger;

a pair of pinching rollers mounted on the frame forward of the main auger and above the ground such that the pinching rollers are oriented substantially perpendicular to the operating travel direction;

a bias element operative to force the pinching rollers against each other;

a drive operative to rotate the pinching rollers such that an empty portion of the grain bag can be fed between the pinching rollers and the pinching rollers rotated to pull the empty portion of the grain bag upward from the ground and forward between the pinching rollers such that the empty portion of the grain bag falls on the ground in front of the pinching rollers as the frame moves rearward, and such that the frame is pulled rearward and the feed auger moves rearward into a filled portion of the grain bag.

2. The apparatus of claim 1 wherein the frame is pivotally mounted on a support carriage for movement along the ground such that the frame is movable from an operating position, where the main auger is substantially vertically oriented, to a transport position where the main auger is tilted forward and the turret auger extends forward from the top end of the main auger, and downward.

3. The apparatus of claim 2 further comprising a support brace operative to support the turret auger in the transport position.

4. The apparatus of claim 1 wherein the turret auger extends laterally from the top end of the main augur and can pivot from a right position extending laterally to a right side of the frame through a transport position extending substantially forward from the main auger, to a left position extending laterally to a left side of the frame.

5. The apparatus of claim 1 wherein the feed auger comprises right and left auger sections driven by corresponding right and left motors located adjacent to the intake end of the main auger.

6. The apparatus of claim 1 further comprising a pan having a lower rear edge located forward of the feed auger and in proximity to the ground, and extending on an incline forward and upward to an upper front edge located rearward of and below a pinching location where the pinching rollers meet.

7. The apparatus of claim 1 wherein the main auger is driven by a rotating shaft mechanism connectable to a tractor power take off.

8. The apparatus of claim 7 wherein the rotating shaft mechanism includes a lateral shaft portion extending from the main auger forward to a tractor hitch location, and a vertical shaft portion extending down the main auger from the lateral shaft portion to a bottom end of the main auger, and an auger drive at a bottom end of the vertical shaft portion connected to a bottom end of a main auger shaft of the main auger.

9. The apparatus of claim 1 wherein the pair of pinching rollers comprises upper and lower pinching rollers mounted on the frame such that the upper pinching roller is above the lower pinching roller.

10. The apparatus of claim 1 further comprising substantially vertically oriented right and left side rollers rotatably mounted to the frame forward of the main auger and configured to contact corresponding right and left sides of the empty portion of the grain bag as the empty portion of the grain bag is pulled upward and forward.

11. A method of extracting grain from a grain bag, the method comprising:

providing a frame mounted for movement along the ground in an operating travel direction;

providing a substantially vertically oriented main auger attached to a rear end of the frame such that an intake end thereof is above the ground and in proximity to the ground;

providing a knife mounted to the frame and configured to extend rearward from the main auger to cut the grain bag;

providing a turret auger pivotally attached to a top end of the main auger such that the turret auger extends laterally from the main auger, and can pivot with respect to the main auger;

providing a feed auger extending laterally right and left of the intake end of the main auger, and configured to auger grain to the intake end of the main auger;

providing a pair of pinching rollers mounted on the frame forward of the main auger and above the ground such that the pinching rollers are oriented substantially perpendicular to the operating travel direction;

forcing the pinching rollers against each other with a bias element;

rotating the pinching rollers and feeding an empty portion of the grain bag between the pinching rollers such that the rotating pinching rollers pull the empty portion of the grain bag upward from the ground and forward between the pinching rollers and such that the frame is pulled rearward and the feed auger moves rearward into a filled portion of the grain bag;

operating the feed auger, main auger, and turret auger to convey grain out of the filled portion of the grain bag and out through a discharge on an outer end of the turret auger;

pivoting the turret auger forward as the frame and attached main auger move rearward to maintain the discharge at a desired location to discharge grain into a transport vehicle;

wherein the frame and pinching rollers are configured such that the empty portion of the grain bag falls on the ground in front of the pinching rollers as the frame moves rearward.

12. The method of claim 11 wherein the frame is pivotally mounted on a support carriage for movement along the ground such that the frame is movable from an operating position, where the main auger is substantially vertically oriented, to a transport position where the main auger is tilted forward and the turret auger extends forward from the top end of the main auger, and downward.

13. The method of claim 12 further comprising supporting the turret auger in the transport position on a support brace extending upward from the support carriage.

14. The method of claim 11 wherein the turret auger extends laterally from the top end of the main augur and can pivot from a right extending laterally to a right side of the frame position, through a transport position extending substantially forward from the main auger, to a left position extending laterally to a left side of the frame.

15. The method of claim 11 wherein the feed auger comprises right and left auger sections driven by corresponding right and left motors located adjacent to the intake end of the main auger.

16. The method of claim 11 further comprising providing a pan having a lower rear edge located forward of the feed auger and in proximity to the ground, and extending on an incline forward and upward to an upper front edge located rearward of and below the gap between the pinching rollers, and supporting the empty portion of the grain bag on the pan as the empty portion of the grain bag is pulled upward from the ground and forward between the pinching rollers.

17. The method of claim 11 wherein the main auger is driven by a rotating shaft mechanism connectable to a tractor power take off.

18. The method of claim 17 wherein the rotating shaft mechanism includes a lateral shaft portion extending from the main auger forward to a tractor hitch location, and a vertical shaft portion extending down the main auger from the lateral shaft portion to a bottom end of the main auger, and an auger drive at a bottom end of the vertical shaft portion connected to a bottom end of a main auger shaft of the main auger.

19. The method of claim 11 further comprising rotatably mounting substantially vertically oriented right and left side rollers to the frame forward of the main auger and configuring the side rollers to contact corresponding right and left sides of the empty portion of the grain bag as the empty portion of the grain bag is pulled upward and forward.

* * * * *